(12) United States Patent
Tamayo et al.

(10) Patent No.: US 8,154,743 B2
(45) Date of Patent: Apr. 10, 2012

(54) PRINTER TESTING SYSTEM THAT CONSERVES PAPER AND TONER

(75) Inventors: Paolo A. Tamayo, San Ramon, CA (US); Emilia D. Baranda, Concord, CA (US); Barry Sia, Concord, CA (US)

(73) Assignees: Kyocera Mita Corporation, Osaka-shi, Osaka (JP); Kyocera Technology Development, Inc., Concord, CA (US)

( * ) Notice: Subject to any disclaimer, the term of this patent is extended or adjusted under 35 U.S.C. 154(b) by 1062 days.

(21) Appl. No.: 11/607,616

(22) Filed: Dec. 1, 2006

(65) Prior Publication Data

US 2008/0130037 A1    Jun. 5, 2008

(51) Int. Cl.
  *G06K 15/00* (2006.01)
  *G06F 15/00* (2006.01)
  *G06F 3/12* (2006.01)
  *G06F 1/00* (2006.01)

(52) U.S. Cl. ............. 358/1.15; 358/1.18; 358/1.14; 358/1.13; 358/1.2

(58) Field of Classification Search .......... 358/1.18, 358/1.14, 1.13, 1.16, 1.15, 1.2
  See application file for complete search history.

(56) References Cited

U.S. PATENT DOCUMENTS

| | | | |
|---|---|---|---|
| 5,713,032 A | 1/1998 | Spencer | |
| 6,538,763 B1 | 3/2003 | Klosterman | |
| 6,587,972 B1 | 7/2003 | Baird | |
| 7,102,765 B1 | 9/2006 | Abi-Saleh | |
| 7,131,067 B1 * | 10/2006 | Ikeda | 715/209 |
| 2002/0131086 A1 * | 9/2002 | Mori et al. | 358/1.18 |
| 2003/0110412 A1 | 6/2003 | Neville | |
| 2004/0030809 A1 | 2/2004 | Lozano | |
| 2005/0002052 A1 | 1/2005 | Yang | |
| 2005/0206936 A1 * | 9/2005 | Byde et al. | 358/1.12 |
| 2006/0203272 A1 | 9/2006 | Manalo | |
| 2006/0250630 A1 * | 11/2006 | Mori | 358/1.13 |

FOREIGN PATENT DOCUMENTS

JP    10175345 A  *  6/1998

* cited by examiner

*Primary Examiner* — Thomas Lett (57) ABSTRACT

A method for processing print data to a printer, comprising processing data through an optimized tester, which transforms the data by simplifying each page image while preserving information to enable recognizing identity of each page; and sending the transformed print data to a printer. The invention results in conservation of paper and toner while testing of printing systems, and presents a uniform and general way of transforming print data by simplifying each page image. The methods also include shifting printing position for each printing run to enable reuse of paper, substitution with an identification number or scaled-down image; sending normal print data through optimized tester; optimized tester generating print data, using saved print file; printer driver containing optimized tester; embedding print data PDL with tester commands; processing data through optimized tester parser and renderer within printer controller; saving data in NVRAM; and only storing log data corresponding to simplified transformed data into log storage without consumption of paper or toner.

20 Claims, 9 Drawing Sheets

For a 3 Page Document

First Test Run

Second Test Run (paper is reused)

Third Test Run (paper is reused)

PRINTER TESTING SYSTEM THAT CONSERVES PAPER AND TONER

FIELD OF THE INVENTION

This invention relates to processing a print data to a printer, and more particularly to methods of using an optimized tester that transforms the print data by simplifying each page image in order to reuse paper and conserve toner.

BACKGROUND OF THE INVENTION

In the course of developing a new printing system, tremendous amount of testing of various features is required. Rigorous quality assurance and verification process involve vast expenditure of resources and time. Interactions of the features also need to be tested, as using one feature may affect the operation and outcome of another feature. As the number of features of a device increases, the combinations of the features increases near-exponentially. Some facets of printer testing absolutely require actual printing, such as when the texture of the printing output needs to be examined. On the other hand, there are situations in which actual printing is not necessary, for the aspects being tested are focused on printing logic or printing sequence. In this case, actual full-size printing effectively results in waste of printing paper, toner, time, and other resources, human and otherwise. A need for an optimized printer testing system that conserves paper and toner was acutely felt for those latter situations. The present invention arose out of the above perceived needs and concerns associated with testing of printing systems, and presents a uniform and general way of transforming print data by simplifying each page image in order to reuse paper and conserve toner.

SUMMARY OF THE INVENTION

Methods, computer program products, computing and printing systems for processing a print data to a printer, and more particularly methods of using an optimized tester that transforms the print data by simplifying each page image in order to reuse paper and conserve toner are described. Presented are methods to minimize usage of paper and toner while testing a printer system's basic operations. Stately differently, the invention generally pertains to emulation of the print data in a print job using an application on the host and sending the print job to the printer through a network connection or a port. In particular, the invention relates to the method of testing the basic functionalities of the printing system using the emulated print data. The invention presents a general way of transforming print data by simplifying each page image in order to reuse paper and conserve toner. The transformation process involves a robust hijacking or post-processing of the print stream.

In any new printing system development, testing requires the bulk of resources and time. The number of test cases that needs to be verified increases with the number of features added to the system. Emerging printing systems has evolved from single functionality such as printing to multi-functional devices. This in turn requires more and more time to verify the functionalities. All these testing will require the usage of paper and toner and with the bulk of the testing required it is inevitable that more and more paper and toner will be used.

The scope of testing covers all the functionality of the printing system. Part of the testing will require the checking of the printed data as against the original document. Another portion of the testing will check the printing logic or printing sequence. This part assumes that the printed data will always be correctly printed no matter how much of the page is filled with data. The focus of these tests is more on the sequence of mechanical events coupled with the logical control of these mechanical parts using the processor that controls the whole printing system. Embedded software residing on the printer that controls the printing process is being tested. Print data that arrives in the printer system is processed and preparation of the print engine is started. After data for a page or group of pages are received and processed, actual printing sequence is started. The logical sequencing of the events to successfully print a page is managed by the controller and the engine. This sequence will have variations depending on the job being printed. A simplex (one-sided) printing will have different sequence than that of a duplex (two-sided) printing. A monochrome printout will have a different sequence than that of a colored printout. These different scenarios will need different synchronization of events for the whole mechanical and electrical processes to be successful.

When testing these permutations of the functionality combinations it is often times wasteful on paper and toners since print data is always assumed to be correct. It is the intention of this invention to minimize the use of paper (through efficient use and reuse) and at the same time minimize the amount of toner being used in the process of testing certain functionalities.

In an aspect of the present invention, the result is conservation of paper and toner while testing of printing systems, and presentation of a uniform and general way of transforming print data by simplifying each page image.

In further aspects of the present invention, the methods also include shifting printing position for each printing run to enable reuse of paper, substitution with an identification number or scaled-down image; sending normal print data through optimized tester; optimized tester generating print data, using saved print file; printer driver containing optimized tester; embedding print data PDL with tester commands; processing data through optimized tester parser and renderer within printer controller; saving data in NVRAM; and only storing log data corresponding to simplified transformed data into log storage without consumption of paper or toner.

The invention will be more fully understood upon consideration of the detailed description below, taken together with the accompanying drawings.

DETAILED DESCRIPTION OF THE INVENTION

In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Whenever a new printer model is developed, we use a lot of paper and toner to test the printer operations. Testing usually focuses on two main areas: (1) the printing operation of the printer; and (2) the output (actual print out details). The printing operation of the printer focuses on the sequences of steps taken from the moment a print job is received up to the point where the last paper is ejected. The output focuses on the actual image printed on the paper (text or graphics).

Testing on the printer operation assumes that the data is correctly printed into the page. Since more and more features are added into the printer, the complexity of testing is also compounded. Combinations of the options lead to multiple runs of the same test data. For example, a 50 page document can be used to test the different combinations of the following features:

a. duplex printing
b. simplex printing
c. 1, 2, 4 . . . N-up printing
d. different paper sizes on one document Combining a, b and c alone will give this number of combinations: n! (Duplex printing)+n! (Simplex printing)=2(n!). For n=5 with {1, 2, 4, 6, 8} members we get 5!=120. Thus we have 120×2 or 240 runs of the same test. Adding paper sizes feature will geometrically increase the total runs of the same test. If the test data has 20 pages then the total number of paper used in testing a, b and c features will be at least 4800 pages (240×20).

According to a study by IDC (International Data Corporation) sponsored by Kyocera on total cost of ownership of a laser printer, specifically in the cost of toner used, the average cost per page of a monochrome printer has a range of 0.7 cents (best case) to 2.7 cents (worst case). For a 4800 page printout we get $33.6 (best case) to $129.6 (worst case), a difference of $96. If we can minimize the toner usage to the best case (in normal printing) or even better, we can save at least $48-$33.6=$14.4, where the average cost is $48=[129.6-33.6]/2. So in one regression test run of the combination of features mentioned above we save at least $14.4. Throughout the development of the product the regression test is run multiple times. At least one run per version of the system before it is released to the market. Total cost for developing new products can be improved if the invention is implemented to all products.

These tests focus on the correct sequence of the printout. It does not matter if the page being printed has a lot of data in it or just one small character in it as long as the numbers of pages are printed in sequence according to the specifications and based on the option selected.

Looking at this fact we see that we can actually reuse the paper that we are using and save toner at the same time. We may ask ourselves, what if we can elect to use a test data that will print in a designated area of each page and still give the tester feedback that the correct sequence of pages are being printed. If we make the printout small and assign the location of the printout we can reuse the paper and save toner.

Figure 1:
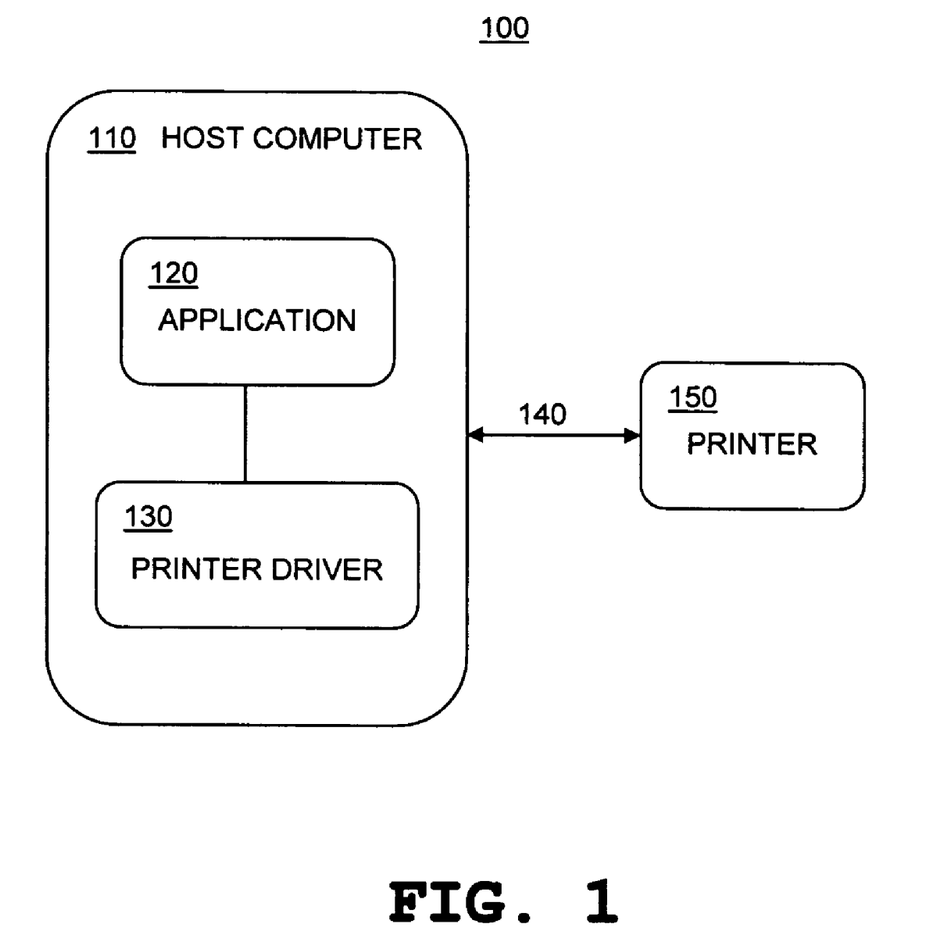
FIG. 1 is a simplified block diagram showing connection of a computing system to a printer, in accordance with a preferred embodiment of the present invention.

FIG. 1 is a simplified block diagram showing connection of a computing system to a printer, in accordance with a preferred embodiment of the present invention. FIG. 1 shows a general printing system setup 100 that includes a host computer 110 and a printer 150. Here, the printer 150 may be any device that can act as a printer, e.g. an inkjet printer, a laser printer, a photo printer, or an MFP (Multifunction Peripheral or Multi-Functional Peripheral) that may incorporate additional functions such as faxing, facsimile transmission, scanning, and copying.

The host computer 110 includes an application 120 and a printer driver 130. The application 120 refers to any computer program that is capable of issuing any type of request, either directly or indirectly, to print information. Examples of an application include, but are not limited to, commonly used programs such as word processors, spreadsheets, browsers and imaging programs. Since the invention is not platform or machine specific, other examples of application 120 include any program written for any device, including personal computers, network appliance, handheld computer, personal digital assistant, handheld or multimedia devices that is capable of printing.

The printer driver 130 is a software interfacing with the application 120 and the printer 150. Printer drivers are generally known. They enable a processor, such as a personal computer, to configure an output data from an application that will be recognized and acted upon by a connected printer. The output data stream implements necessary synchronizing actions required to enable interaction between the processor and the connected printer. For a processor, such as a personal computer, to operate correctly, it requires an operating system such as DOS (Disk Operating System) Windows, Unix, Linux, Palm OS, or Apple OS.

A printer I/O (Input/Output) interface connection 140 is provided and permits host computer 110 to communicate with a printer 150. Printer 150 is configured to receive print commands from the host computer and, responsive thereto, render a printed media. Various exemplary printers include laser printers that are sold by the assignee of this invention. The connection 140 from the host computer 110 to the printer 150 may be a traditional printer cable through a parallel interface connection or any other method of connecting a computer to a printer used in the art, e.g., a serial interface connection, a remote network connection, a wireless connection, or an infrared connection. The varieties of processors, printing systems, and connection between them are well known.

The present invention is suited for printer drivers, and it is also suited for other device drivers. The above explanations regarding FIG. 1 used a printer driver rather than a general device driver for concreteness of the explanations, but they also apply to other device drivers. Similarly, the following descriptions of the preferred embodiments generally use examples pertaining to printer driver, but they are to be understood as similarly applicable to other kinds of device drivers.

Figure 2:
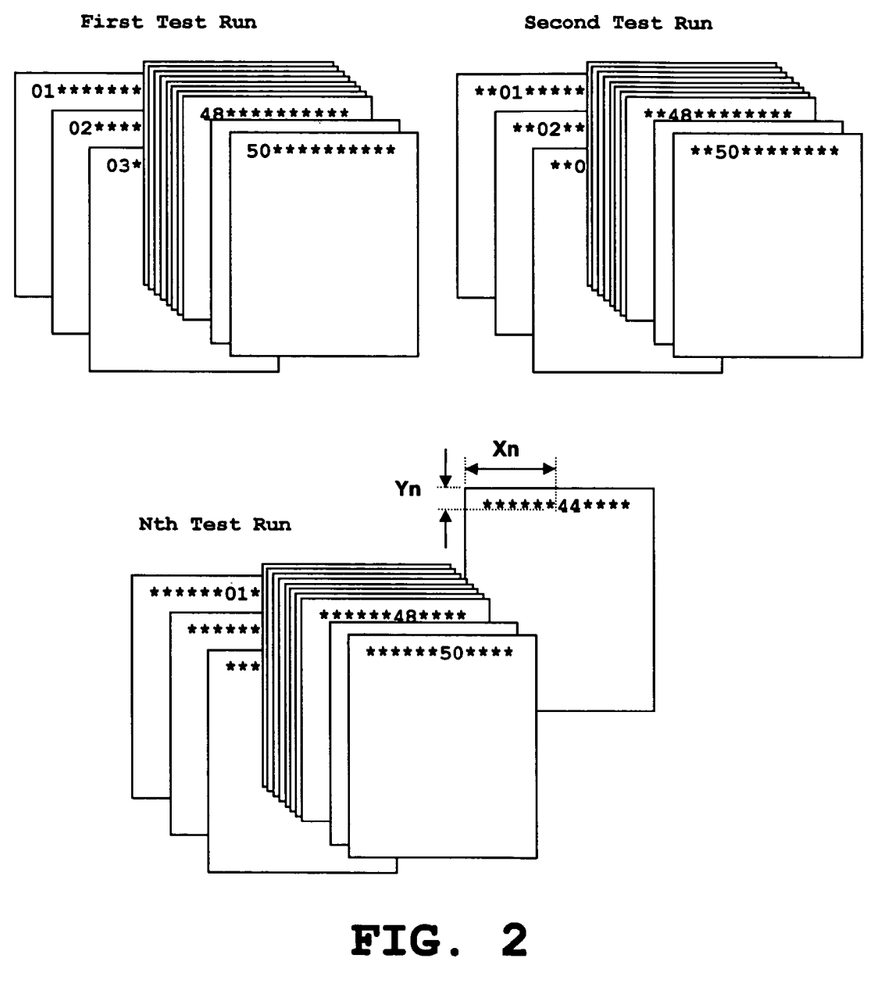
FIG. 2 is a diagram showing transformed page layouts using identification numbers of test print results, in accordance with a preferred embodiment of the present invention.

FIG. 2 is a diagram showing transformed page layouts using identification numbers of test print results, in accordance with a preferred embodiment of the present invention.

In the figure, the character "*" represents one character space position and width, "Xn" represents the x position of the page counter on the nth test run, and "Yn" represents the y position of the page counter on the nth test run.

In FIG. 2 we print the characters "01" on the first page with a 5×5 millimeter size for each character starting on X1 and Y1 location of the page, where X1 is not necessarily equal to Y1. On the second page we print the characters "02" on the same X1 and Y1 location. The numbers that are printed will serve as page counters and at the same time markers to represent that all pages are printed successfully. For each page the count is printed on the same position as the first page. If the document has 50 pages, 50 sheets are used to print the first run of the test on simplex printing.

On the second run of the test, the X and Y position are adjusted. The new X2 and Y2 position will be used to print page numbers. This will enable the reuse of the original 50 sheets used in the first run of the test. On the nth run of the test, the Xn and Yn position are used. Therefore the same set of 50 sheets can be reused to run the test n times. The new X and Y position are chosen to efficiently reuse the paper.

Figure 3:
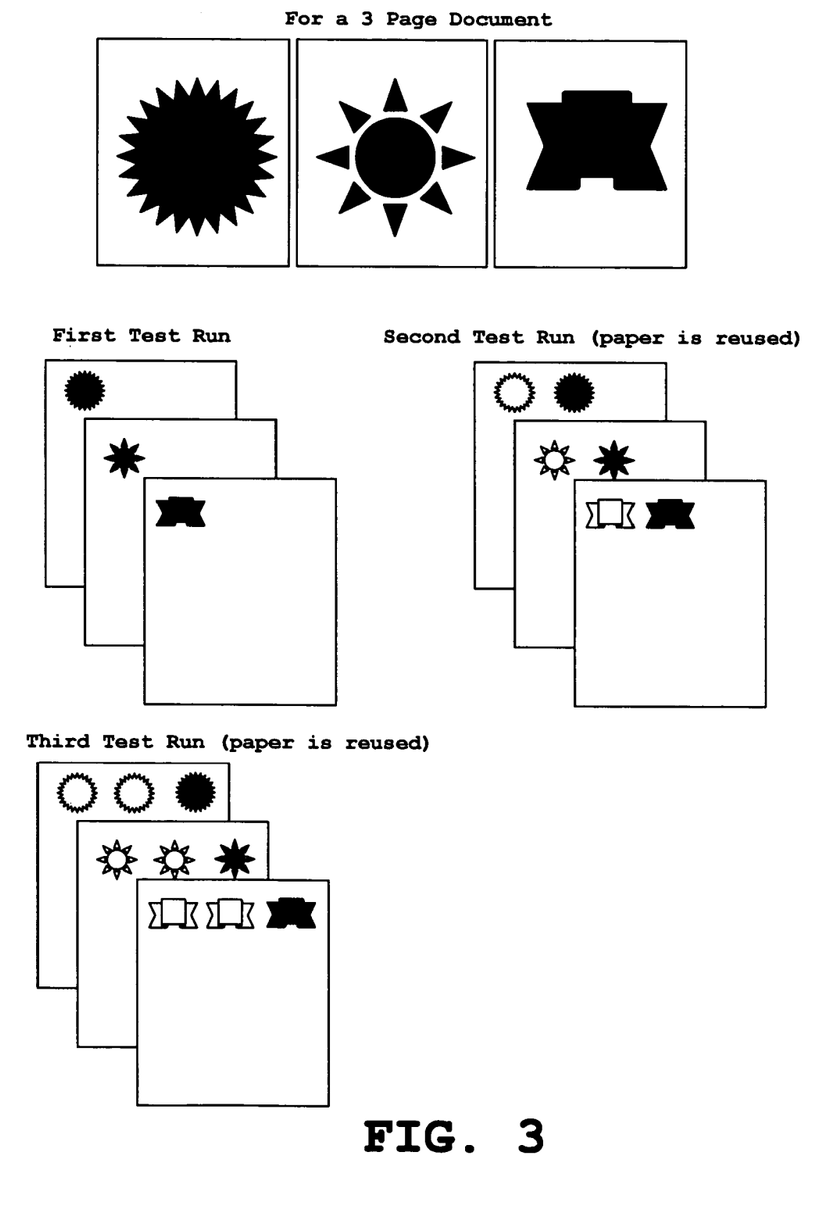
FIG. 3 is a diagram showing scaling-transformed page layouts of test print results, in accordance with a preferred embodiment of the present invention.

FIG. 3 is a diagram showing scaling-transformed page layouts of test print results, in accordance with a preferred embodiment of the present invention. In the figure, the solid filled images represent the current test run printout, and the unfilled images represent the previous test run printout.

The printout will not be restricted to a set of characters. The size can also be varied. For example, instead of printing a character on position X, Y we print an image with the size m x n starting from the same X, Y position. One example of the usage of this variation is to test color planes of a colored printer. For each page a rectangular shaped object or image for each color plane of CMYK planes is generated. Thus, four rectangles one for Cyan, Magenta, Yellow and Black are drawn on each page. This test can also test the video interface for each color. Vertical lines and/or horizontal lines can be drawn for each CMYK planes. Another variation of the methodology's output is shown in FIG. 3. In this variation the original page created from the application is modified and resized according to the tester's specifications. The same arrangements as in FIG. 2, the actual page are printed on one location on each page. On the second run of the test, the location is modified and the previous set of paper used can be reused. This will still give the tester feedback on the correct sequence of pages being printed and save on toner and paper used.

Figure 4:
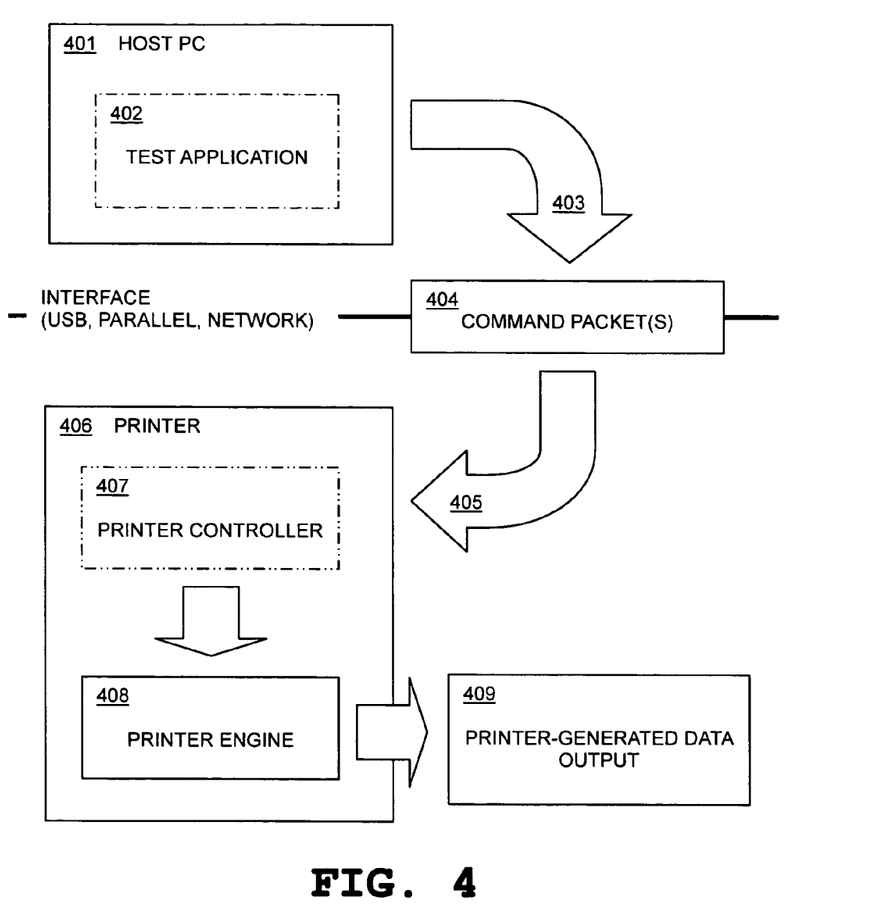
FIG. 4 is a block diagram showing host PC, printer components and data flows, in accordance with a preferred embodiment of the present invention.

FIG. 4 is a block diagram showing host PC, printer components and data flows, in accordance with a preferred embodiment of the present invention. The methodology is implemented following the functional block diagram shown in this figure.

The Host PC 401 contains the Test Application 402 which may consist of the Application, the Printer Driver and the Optimized Tester Application. The components may vary depending on the modes and the approach used to implement the method. The Test Application 402 generates the test document according to the parameters specified by the user.

The test document 403 is transformed into print data and sent to the printer as series of command packets. The command packets 404 are sent to the printer controller via a variety of standard interface methods such as but not limited to USB, Parallel and Serial Ports and Network. Communication 405 between the Test Application and the Printer Controller takes place through a protocol both entities comply to. In one embodiment, a command-response scheme via exchange of data packets is used.

The command packets 404 arrive at the Printer 406 using any of the available Printer I/O Ports. The Printer consists of several components including the Printer Controller 407 which manages the printer operations. The arriving packets, after validation, are processed in the Printer Controller module 407.

The Printer Controller 407 receives the data and parses the data for any Test Application commands. Depending on the command, the data is either manipulated or stored into memory prior to actual printing in the Printer Engine 408. The Printer Engine 408 receives the print data and transforms it into the print media. The printed output 409 is produced according to the parameters specified in the Test Application commands sent with the print job or specified in the input of the Tester Application by the user.

To facilitate the discussion of Implementation A, which is an implementation of the invention, the following configurations are identified.

Figure 5:
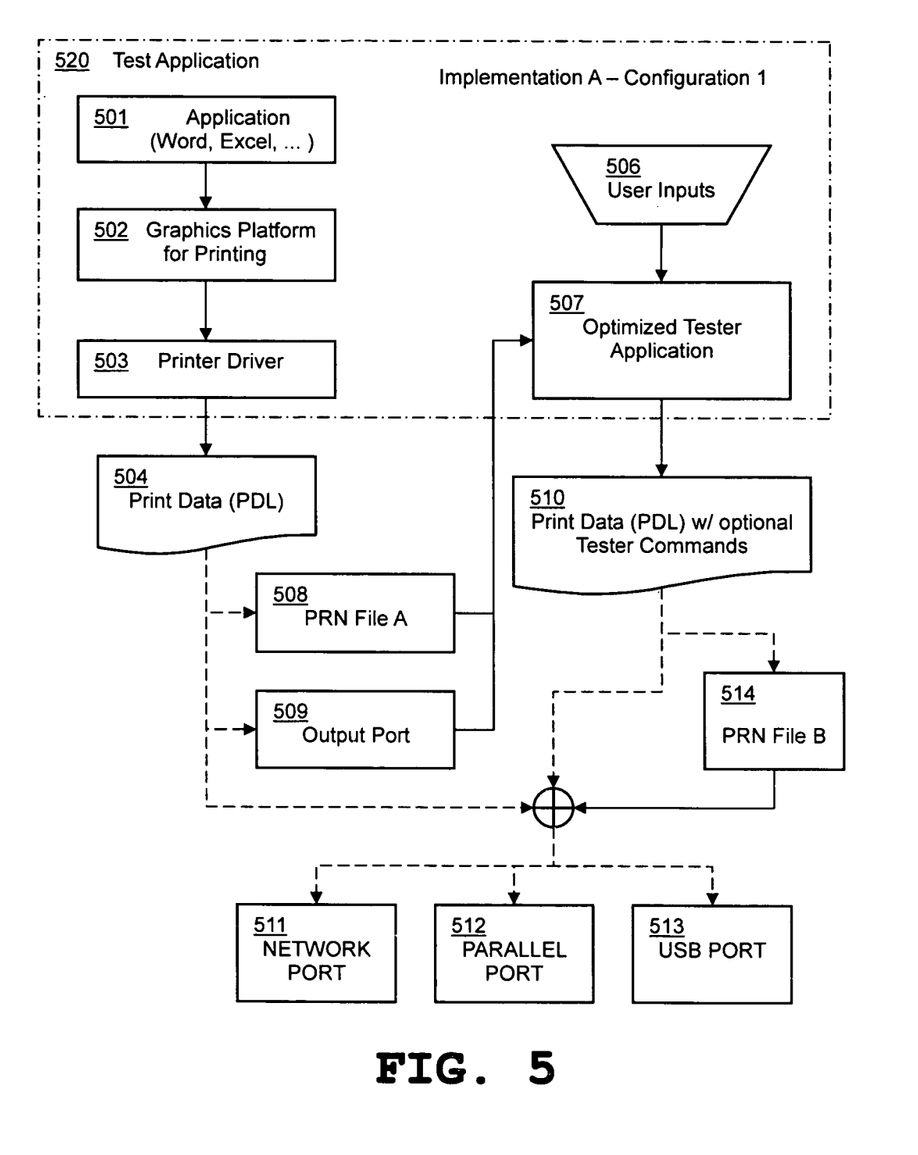
FIG. 5 is a block diagram showing host side implementation A, configuration 1, in accordance with a preferred embodiment of the present invention.

Configuration 1—This configuration utilizes the Application in the host to generate the pages of the document. The generated test document or Print Data PDL (Page Description Language or Printer Description Language) can be sent to 2 different routes. Configuration 1 is shown graphically in FIG. 5. FIG. 5 is a block diagram showing host side implementation A, configuration 1, in accordance with a preferred embodiment of the present invention.

(a) Routed to the Optimized Tester Application for processing. The Optimized Tester Application can modify the PDL to realize the outputs described in FIGS. 2 and 3. Tester Commands can also be embedded into the new PDL. The Tester Commands are used to instruct the firmware in the Printer Controller if further processing is needed before the job is sent to the Engine. A parser in the Printer Controller is implemented to perform this task.

(b) Sent directly to the printer and let the Printer Controller do the processing. In this route, the Printer Controller is instructed by the tester prior to the sending of the job if further processing will be required or not. This portion of the operation will be discussed in detail in the succeeding section.

Figure 6:
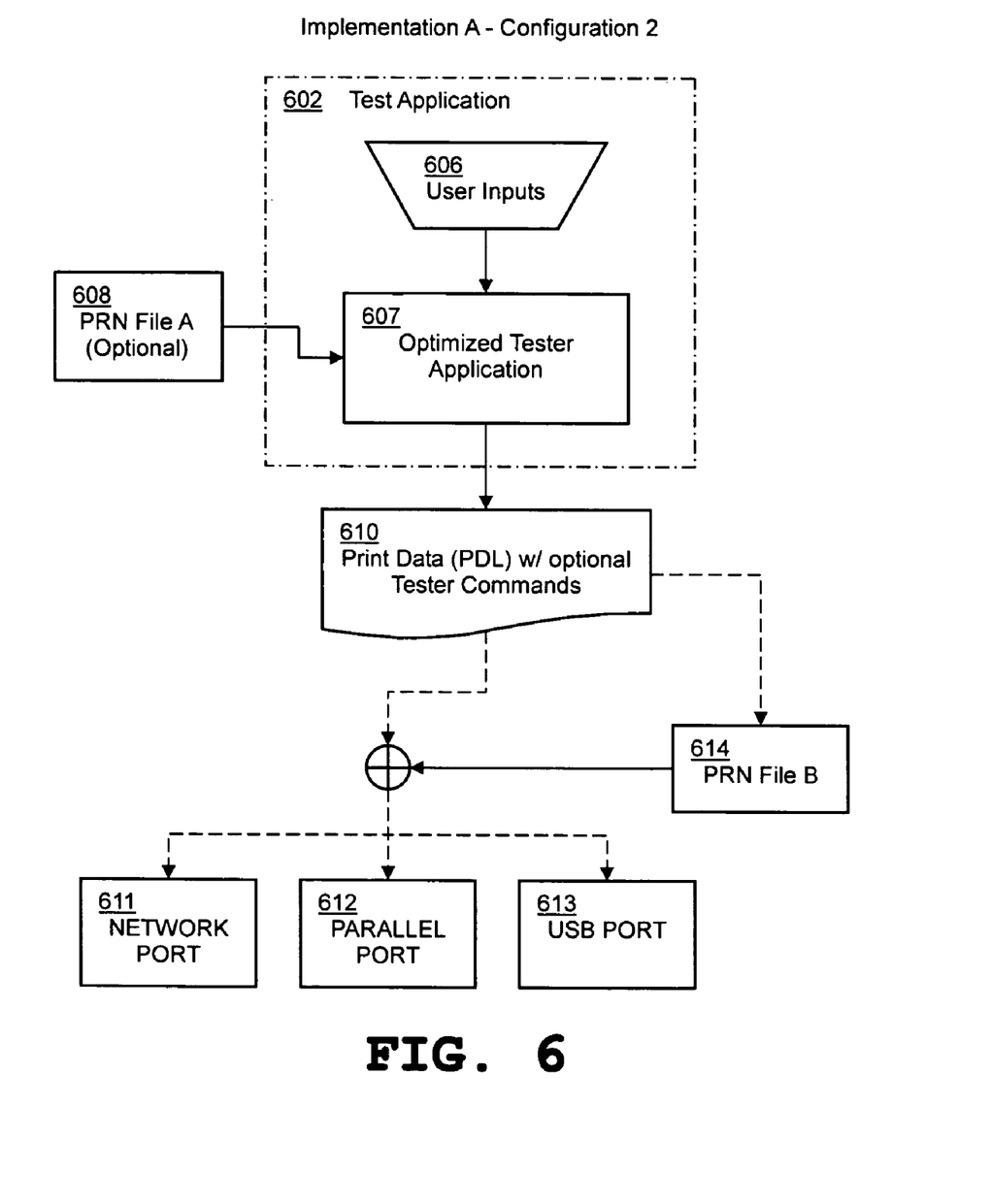
FIG. 6 is a block diagram showing host side implementation A, configuration 2, in accordance with a preferred embodiment of the present invention.

Configuration 2—The main difference of this configuration is that it has the option to generate a test document without the aid of an application. The Optimized Tester Application can be configured to generate the test document. It can also retrieve a saved print job in the form of a PRN file previously generated from an Application. The output Print Data (PDL) may or may not contain embedded Tester Commands. Configuration 2 is shown graphically in FIG. 6. FIG. 6 is a block diagram showing host side implementation A, configuration 2, in accordance with a preferred embodiment of the present invention.

For each of the configurations described above, there are two major modes. First is the Normal Testing Mode and second is the Save Testing Mode. These two modes are used to focus the testing on some functionalities of the printer.

1. Normal Testing Mode—This mode follows the normal data path in printing described in FIG. 4. Print job generated in the Test Application is printed on the engine with or without modification by the Test Application or the Printer Controller.

2. Save Testing Mode—This mode still follows the data path in printing described in FIG. 4, but that path is modified on the Printer Controller side. In the Save mode, the first print data that the Test Application sends is not only printed but also stored in memory. The memory storage may be in non-volatile area or in volatile area depending on the system. Once a print data is stored in the printer memory, the next job may be initiated in the printer using the Front Panel menu interface of the printer. This gives the versatility on testing by automatically creating the job without the Test Application or host application initiating the job. This feature is very useful in testing problematic sequence that requires intensive testing of the same test parameters over and over again. It also gives versatility in testing by allowing focus of targeted testing on specific job parameters.

The different variation on the type of test data used is classified into the following categories:

1. Image Outputs—This type is generated using Mode 1. Pages created from the Application are resized by the Optimized Tester Application. This type is shown in FIG. 3.

2. Text Outputs—This type is shown in FIG. 2. This type of output is used in Mode 2 and generated by the Optimized Tester Application.

3. Graphics/Color Outputs—This type is generated using Mode 2. These outputs are usually used to test color planes and video functionalities.

For all categories, scaling, resizing, stretching and repositioning of the page are performed. This is dependent on the user commands and parameters supplied when the test was started.

FIG. 5 is a block diagram showing host side implementation A, configuration 1, in accordance with a preferred embodiment of the present invention. Note that block diagrams contain arrows with solid and dotted lines to show flow of data and control. Arrows with solid lines indicate normal flows, and arrows with dotted lines indicate where there are alternative flows.

An implementation of the invention is shown in FIG. 5. This figure shows Configuration 1 sequence of operation. In this configuration, the print job is originally created from the Application 501 (Word, Excel etc.). This is any Application that can generate a print out of the document that uses the printing system that includes the methodology of the invention. Items in the document are converted into Graphics Objects using the Graphics Device Interface 502. The objects are then passed to the Printer Driver 503 for processing and conversion into Print Data (PDL) 504. Once the print data is now in the format of a PDL, it can be saved into a file (PRN File) 508 to be used later as an input to the Optimized Tester Application or directly sent into a Port 509 specifically mapped for the Optimized Tester Application 507. Normally, the print data can also be sent directly to the printer device through Network connection 511, a parallel port 512 or a USB port 513.

When data is routed to the Optimized Tester Application 507, it can be further processed depending on the User Inputs 506. In Configuration 1, user inputs the commands prior to job sending. These commands give the user the ability to control the output to the printer. Using some special command formatting, the user can instruct the Optimized Tester Application to implement the methods of FIG. 2 and FIG. 3. One such use is to enable the Save Mode in the Printer Controller. The optional user inputs 506 specify directive commands that might be entered from a command line or specialized GUI, such as a command to run the test file five times and wait after each iteration, or a command specifying manual duplexing, etc. The output of the Optimized Tester Application is also print data in PDL format 510 but now includes special commands to further manipulate the print job in the printer by the printer firmware. This output can be directly sent to the printer devices using one of the assigned ports in the host 511, 512, 513 depending on the connection used in the system or saved into a file for future printing 514.

FIG. 6 is a block diagram showing host side implementation A, configuration 2, in accordance with a preferred embodiment of the present invention. Configuration 2 on the other hand provides the same printing features but without the dependence on Host Applications to initiate the print job. FIG. 6 shows the flow of operation for Configuration 2. The user inputs 606 are used by the Optimized Tester Application 607 to print job. Depending on the user commands, print jobs can be generated by the Optimized Tester Application on a stand alone basis. There may be an optional PRN file input 608 to the Optimized Tester Application 607. The output can be any one of the three types of test data described earlier. Print data in PDL format 610 that is generated can be saved into a file 614 or sent to the printer device connected to the host ports as described in Configuration 1. The advantage of this mode is that, jobs can still be sent to the printer without the driver. The Optimized Tester Application serves as the host driver of the printer being tested.

Figure 7:
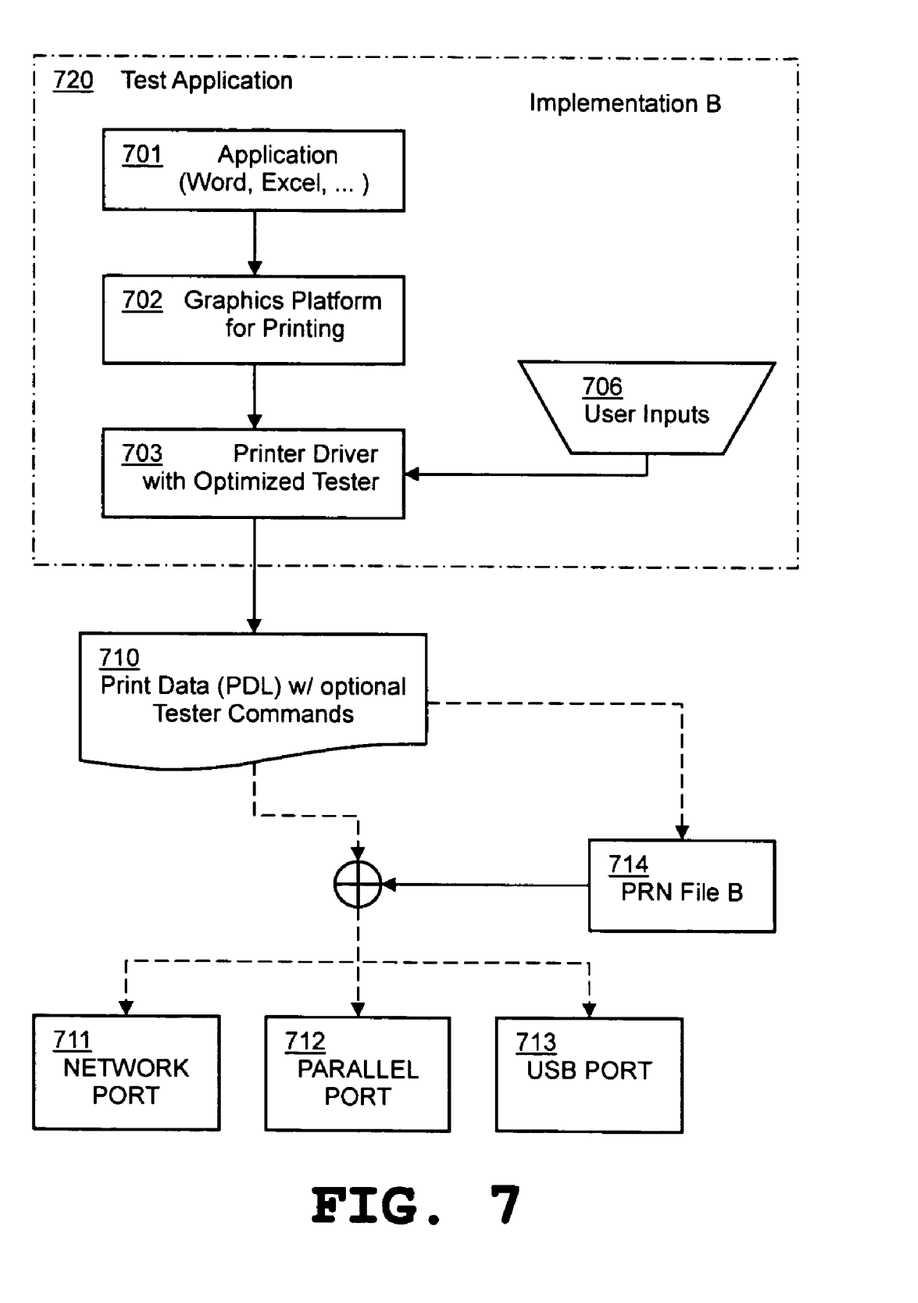
FIG. 7 is a block diagram showing host side implementation B, in accordance with a preferred embodiment of the present invention.

FIG. 7 is a block diagram showing host side implementation B, in accordance with a preferred embodiment of the present invention. The figure shows another approach to implement the invention. In this implementation, the functionalities of the Optimized Tester Application are integrated into the Printer Driver 703 as a special mode on the driver. The host application 701 creates the document to be printed. Items in the document are converted into Graphics Objects using the Graphics Device Interface 702 and this is passed to the Printer Driver with the Optimized Tester 703. The data is then manipulated depending on the User Inputs 706. The final PDL data 710 is then sent to the printer device port (711, 712 or 713) or stored in a file 714. The limitation of this implementation approach is that Configuration 2 is not supported. This implementation only supports the Configuration 1 since it will always need the application to initiate the print job. Other than this limitation, all the other functionalities that were described in Implementation A are supported.

Figure 8:
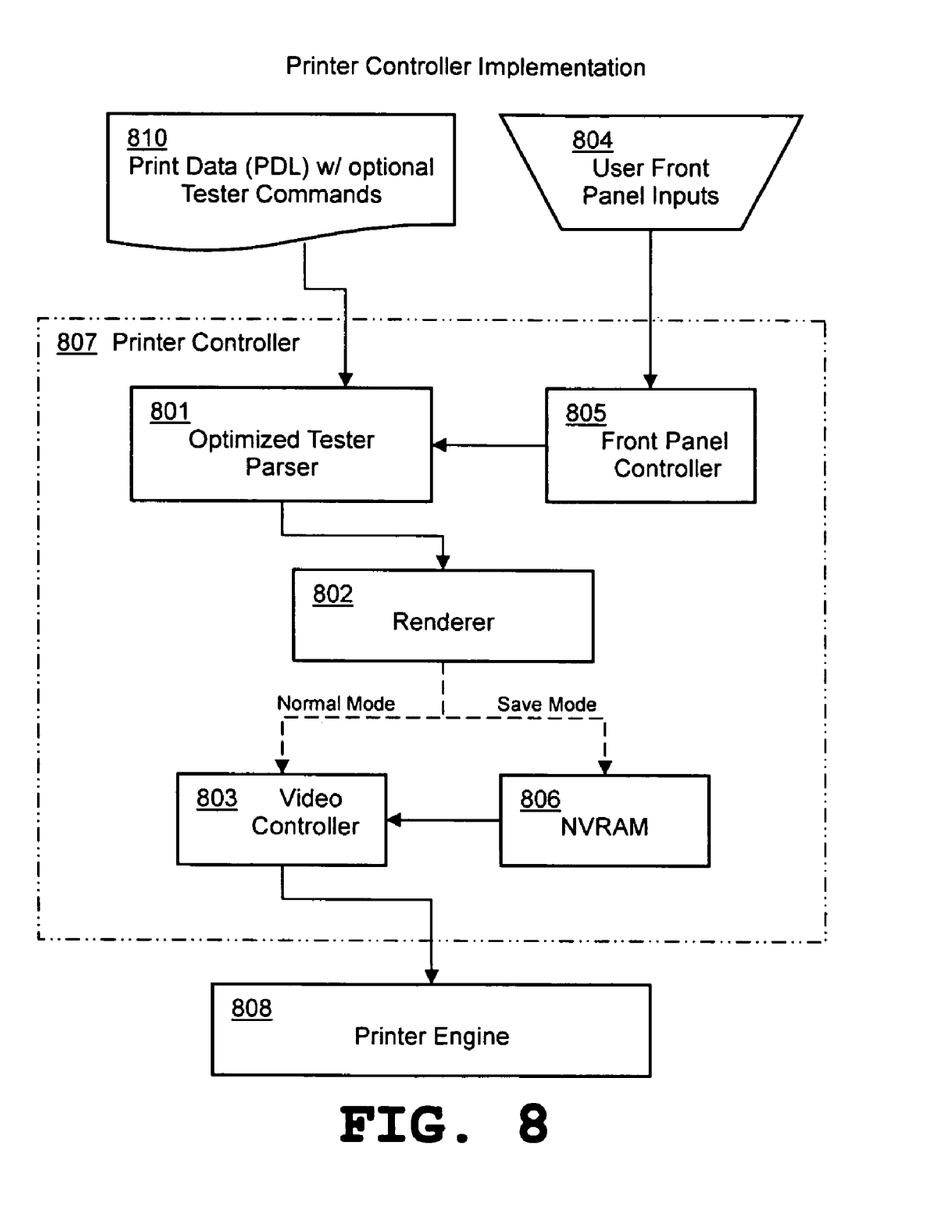
FIG. 8 is a block diagram showing a printer controller side implementation, in accordance with a preferred embodiment of the present invention.

FIG. 8 is a block diagram showing a printer controller side implementation, in accordance with a preferred embodiment of the present invention. The figure shows the two testing modes in the firmware of the printer. The PDL data from the host 810 is received in the Printer Controller 807. The Optimized Test Parser checks the incoming PDL data for user commands from the host. Once the PDL data is ready, it is sent to the rendering module 802. After the rendering module it is sent to the Video controller interface 803 or saved into the Non-Volatile Memory (NVRAM) 806 if the user command is issued to store the job. The Video controller interface 803 sends the received data to the engine 808 for printing.

In the normal mode, the processed PDL data is sent directly the engine for printing. In the Save mode, the PDL data is stored first in the NVRAM 806 before it is sent to the engine. Save mode may be set by the user in two ways. In the host side, specifically in the Optimized Tester Application, the user inputs the command to start Save mode. The first print job that is sent into the printer is embedded with the Save command. This informs the Optimized Tester Parser 801 to set the mode into Save mode. The job is also automatically sent to the NVRAM 806 for storage and the engine 808 for printing. Once Save mode is set, the succeeding jobs that arrive at the printer is accepted but dumped. Instead, the job stored in the NVRAM is the one sent to the engine for printing. The job stored in the NVRAM is always sent to the printer for every print job that arrives until the Save mode is disabled. The disabling command can be sent from the host or from the Front Panel 804 in the printer. Enabling and disabling of the Save mode can also be set using the Front Panel 804.

Figure 9:
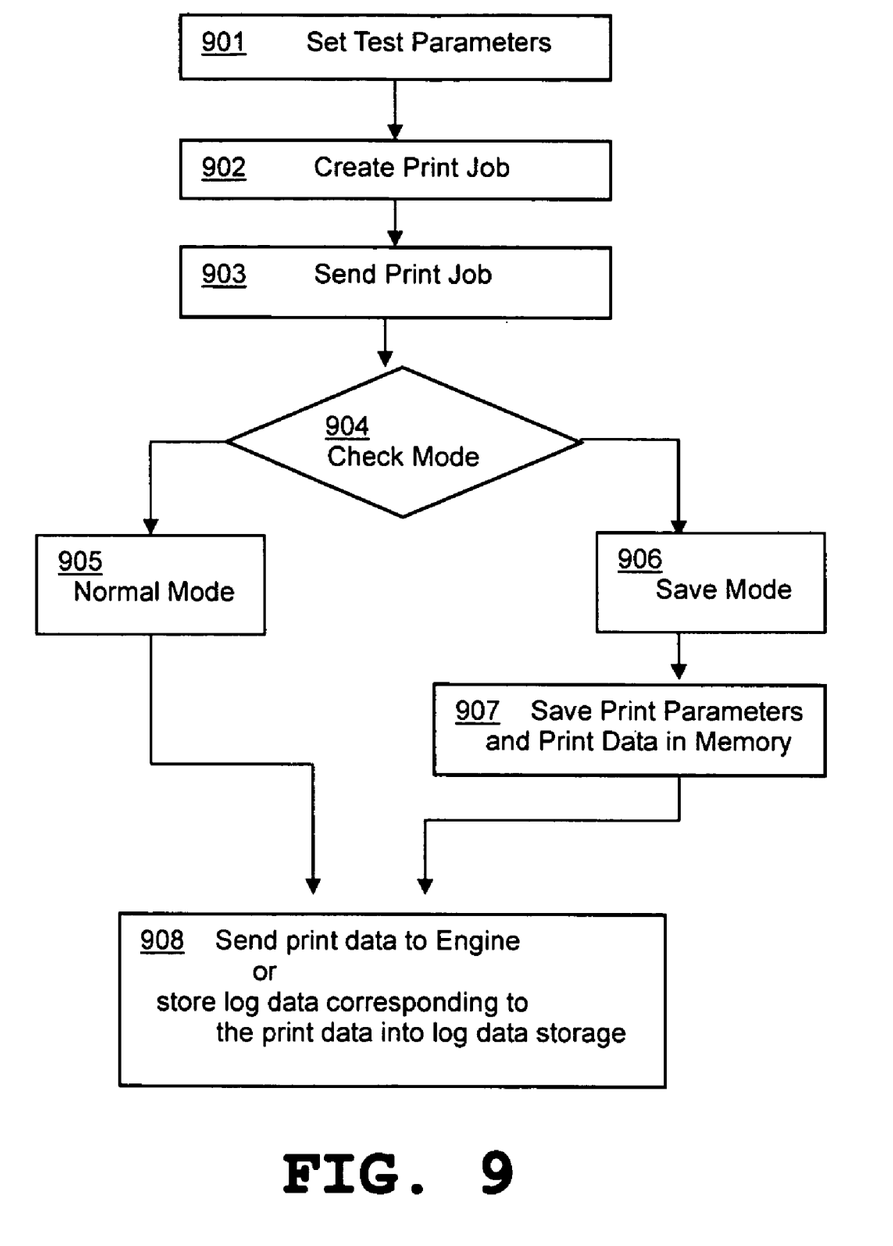
FIG. 9 is a flowchart showing transformation of print data, in accordance with a preferred embodiment of the present invention.

FIG. 9 is a flowchart showing transformation of print data, in accordance with a preferred embodiment of the present invention. An embodiment of the invention follows the flow chart shown in the figure. In step 901, the Test Parameters are set initially by the tester. This setting of the parameters is dependent on the Implementation and Configuration used. For Configuration 1 and 2 of Implementation 1, the parameters are set through the command line console of the Optimized Tester Application. If the Optimized Tester Application has a graphical user interface, then it can be set through that means. For Implementation 2, the test parameters can be retrieved by the Optimized Tester as a mode or function of the printer driver through some parameter files. The parameter file is created prior to the creation of the job from the Application.

In step 902, once the parameters are ready, the print job is created either by the Application or the Optimized Tester Application. In step 903, the print job is then sent to the printer. Once the print job is received in the Printer Controller, the command parser in the printer controller will check for Test Commands.

In step 904, the mode is checked if Save mode is to be enabled or not. If Save mode is enabled 906, the Print Parameters and the Print Data are stored in memory first in step 907 before step 908. If a job arrives with the Save mode still enabled, it will drop the incoming job and print the job that was stored in the memory. Finally, in step 908, the print parameters and the print data are sent to the printer engine, or log entry corresponding to the data is stored in the log data storage. Such an entry can be either displayed continuously for checking or it can be later inspected if the test went correctly. In either case, there is no need to cause consumption of paper or toner, where this is an appropriate approach.

Although this invention has been largely described using terminology pertaining to printer drivers, one skilled in this art could see how the disclosed methods can be used with other device drivers. The foregoing descriptions used printer drivers rather than general device drivers for concreteness of the explanations, but they also apply to other device drivers. Similarly, the foregoing descriptions of the preferred embodiments generally use examples pertaining to printer driver settings, but they are to be understood as similarly applicable to other kinds of device drivers.

Although the terminology and description of this invention may seem to have assumed a certain platform, one skilled in this art could see how the disclosed methods can be used with other operating systems, such as Windows, DOS, Unix, Linux, Palm OS, or Apple OS, and in a variety of devices, including personal computers, network appliance, handheld computer, personal digital assistant, handheld and multimedia devices, etc. One skilled in this art could also see how the user could be provided with more choices, or how the invention could be automated to make one or more of the steps in the methods of the invention invisible to the end user.

While this invention has been described in conjunction with its specific embodiments, it is evident that many alternatives, modifications and variations will be apparent to those skilled in the art. There are changes that may be made without departing from the spirit and scope of the invention.

Any element in a claim that does not explicitly state "means for" performing a specific function, or "step for" performing a specific function, is not to be interpreted as a "means" or "step" clause as specified in 35 U.S.C. 112, Paragraph 6. In particular, the use of "step(s) of" or "method step(s) of" in the claims herein is not intended to invoke the provisions of 35 U.S.C. 112, Paragraph 6.

What is claimed is:

1. A method for processing a print data to a printer, comprising: processing the print data through an optimized tester; the optimized tester transforming the print data by simplifying each page image in the print data into a transformed, simplified, emulated print data, which preserves only information needed for testing printing logic and printing sequence to be performed by a print engine of the printer while printing by the printer of each page, and information in each page to enable recognizing identity of each page;

and sending the transformed, simplified, emulated print data to the printer, wherein sending the information (in the transformed, simplified, emulated print data) needed for testing printing logic and printing sequence to be performed by a print engine of the printer while printing by the printer of each page to the printer enables testing permutations of functionality combinations of the printer's features, and sending the information (in the transformed, simplified, emulated print data) in each page to enable recognizing identity of each page to the printer enables output of information for each page to enable recognizing identity of each page.

2. The method of claim 1, wherein the transforming of the print data comprises shifting the printing position for each printing run to enable reuse of printing paper, and substituting each page with an identification number and/or substituting each page with a scaled-down image of the each page.

3. The method of claim 1, wherein the processing of the print data through an optimized tester comprises a normal printer driver producing a normal print data, and sending the normal print data through the optimized tester, which optionally accepts user inputs.

4. The method of claim 1, wherein the processing of the print data through an optimized tester comprises the optimized tester generating the print data, optionally using a previously-saved print file, wherein the optimized tester optionally accepts user inputs.

5. The method of claim 1, wherein the processing of the print data through an optimized tester comprises an application initiating printing through a printer driver containing an internal optimized tester, which optionally accepts user inputs.

6. The method of claim 1, wherein the optimized tester transforming the print data comprises embedding print data PDL with at least one optional tester command that directs operation of the printer.

7. The method of claim 1, wherein the processing of the print data through an optimized tester comprises processing PDL print data through an optimized tester parser and renderer within a printer controller of the printer, which optionally accepts user front panel inputs.

8. The method of claim 1, wherein the transformed print data is saved in a NVRAM storage of the printer to enable later printing of the transformed print data independently by the printer.

9. The method of claim 1, wherein the sending of the transformed print data to a printer comprises only storing log data corresponding to the simplified transformed print data into test log data storage without consumption of printing paper or toner.

10. A computing system for processing a print data to a printer, comprising: processing the print data through an optimized tester; the optimized tester transforming the print data by simplifying each page image in the print data into a transformed, simplified, emulated print data, which preserves only information needed for testing printing logic and printing sequence to be performed by a print engine of the printer while printing by the printer of each page, and information in each page to enable recognizing identity of each page;

and sending the transformed, simplified, emulated print data to the printer, wherein sending the information (in the transformed, simplified, emulated print data) needed for testing printing logic and printing sequence to be performed by a print engine of the printer while printing by the printer of each page to the printer enables testing permutations of functionality combinations of the printer's features, and sending the information (in the transformed, simplified, emulated print data) in each page to enable recognizing identity of each page to the printer enables output of information for each page to enable recognizing identity of each page.

11. The computing system of claim 10, wherein the transforming of the print data comprises shifting the printing position for each printing run to enable reuse of printing paper, and substituting each page with an identification number and/or substituting each page with a scaled-down image of the each page.

12. The computing system of claim 10, wherein the processing of the print data through an optimized tester comprises a normal printer driver producing a normal print data, and sending the normal print data through the optimized tester, which optionally accepts user inputs; the optimized tester generating the print data, optionally using a previously-saved print file, wherein the optimized tester optionally accepts user inputs; and an application initiating printing through a printer driver containing an internal optimized tester, which optionally accepts user inputs.

13. The computing system of claim 10, wherein the optimized tester transforming the print data comprises embedding print data PDL with at least one optional tester command that directs operation of the printer; and wherein the processing of the print data through an optimized tester comprises processing PDL print data through an optimized tester parser and renderer within a printer controller of the printer, which optionally accepts user front panel inputs.

14. The computing system of claim 10, wherein the transformed print data is saved in a NVRAM storage of the printer to enable later printing of the transformed print data independently by the printer.

15. The computing system of claim 10, wherein the sending of the transformed print data to a printer comprises only storing log data corresponding to the simplified transformed print data into test log data storage without consumption of printing paper or toner.

16. A computer program product in a non-transitory computer-readable storage medium for processing a print data to a printer, comprising machine-readable code for causing a machine to perform method steps of: processing the print data through an optimized tester; the optimized tester transforming the print data by simplifying each page image in the print data into a transformed, simplified, emulated print data, which preserves only information needed for testing printing logic and printing sequence to be performed by a print engine of the printer while printing by the printer of each page, and information in each page to enable recognizing identity of each page;

and sending the transformed, simplified, emulated print data to the printer, wherein sending the information (in the transformed, simplified, emulated print data) needed for testing printing logic and printing sequence to be performed by a print engine of the printer while printing by the printer of each page to the printer enables testing permutations of functionality combinations of the printer's features, and sending the information (in the transformed, simplified, emulated print data) in each page to enable recognizing identity of each page to the printer enables output of information for each page to enable recognizing identity of each page.

17. The computer program product of claim 16, wherein the transforming of the print data comprises shifting the printing position for each printing run to enable reuse of printing paper, and substituting each page with an identification number and/or substituting each page with a scaled-down image of the each page.

18. The computer program product of claim 16, wherein the processing of the print data through an optimized tester comprises a normal printer driver producing a normal print data, and sending the normal print data through the optimized tester, which optionally accepts user inputs; the optimized tester generating the print data, optionally using a previously-saved print file, wherein the optimized tester optionally accepts user inputs; and an application initiating printing through a printer driver containing an internal optimized tester, which optionally accepts user inputs.

19. The computer program product of claim 16, wherein the optimized tester transforming the print data comprises embedding print data PDL with at least one optional tester command that directs operation of the printer; and wherein the processing of the print data through an optimized tester comprises processing PDL print data through an optimized tester parser and renderer within a printer controller of the printer, which optionally accepts user front panel inputs.

20. The computer program product of claim 16, wherein the transformed print data is saved in a NVRAM storage of the printer to enable later printing of the transformed print data independently by the printer; and wherein the sending of the transformed print data to a printer comprises only storing log data corresponding to the simplified transformed print data into test log data storage without consumption of printing paper or toner.

* * * * *